Oct. 12, 1965

F. HOLLADAY 3,211,271

LINE FIND DEVICE

Filed Nov. 6, 1963

INVENTOR.
FORREST HOLLADAY.
BY
Wallace P. Lynch
ATTORNEY.

Oct. 12, 1965
F. HOLLADAY
3,211,271
LINE FIND DEVICE
Filed Nov. 6, 1963
5 Sheets-Sheet 2
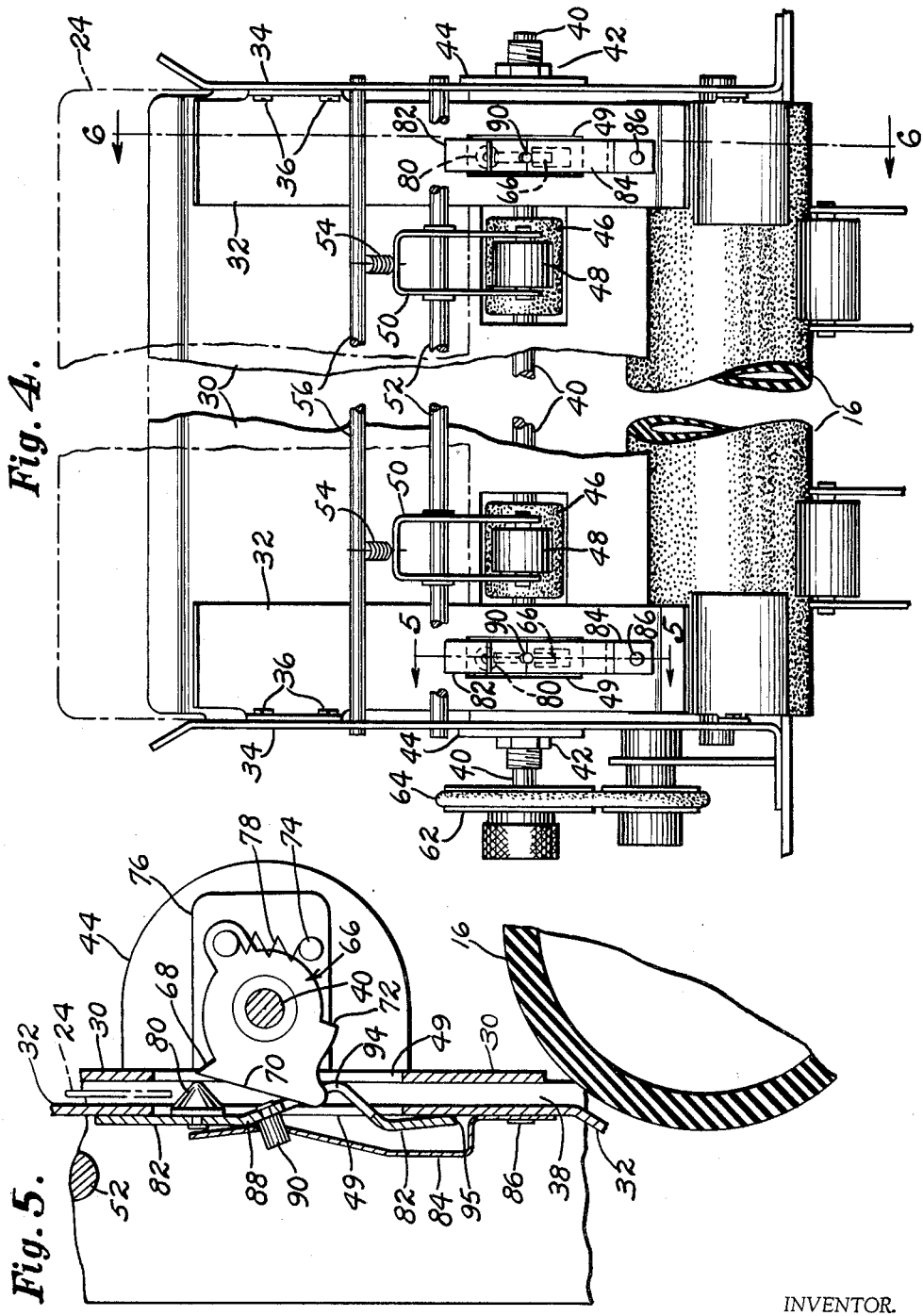
INVENTOR.
FORREST HOLLADAY.
BY
*Wallace P. Lamb*
ATTORNEY.

Oct. 12, 1965
F. HOLLADAY
3,211,271
LINE FIND DEVICE
Filed Nov. 6, 1963
5 Sheets-Sheet 3
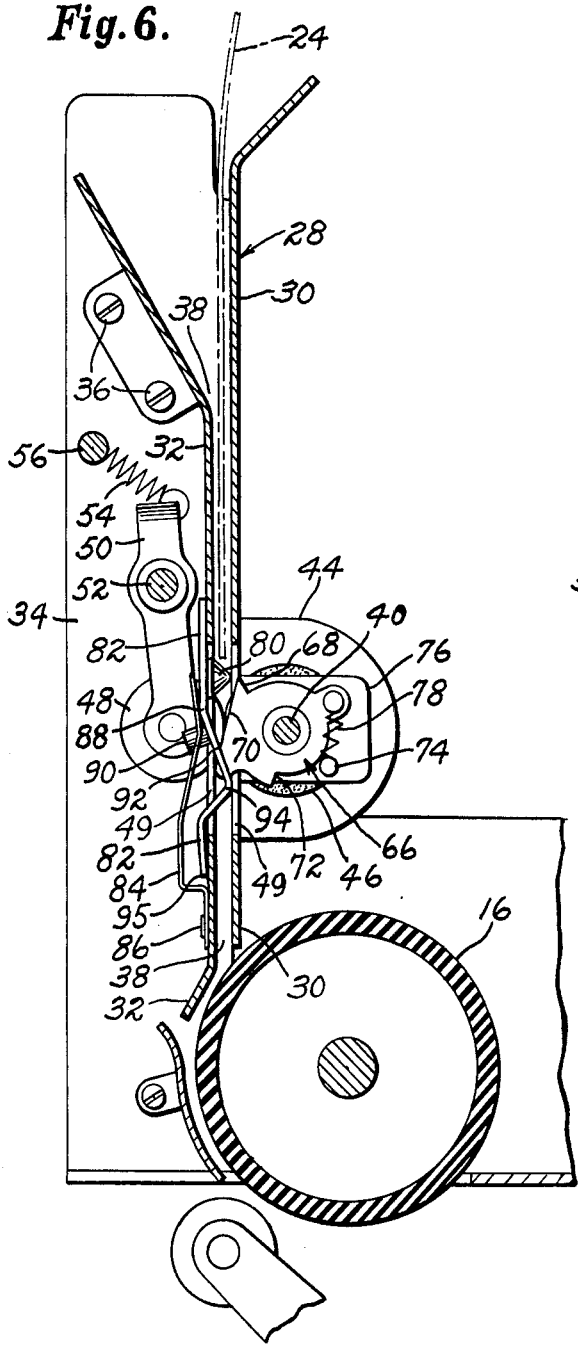
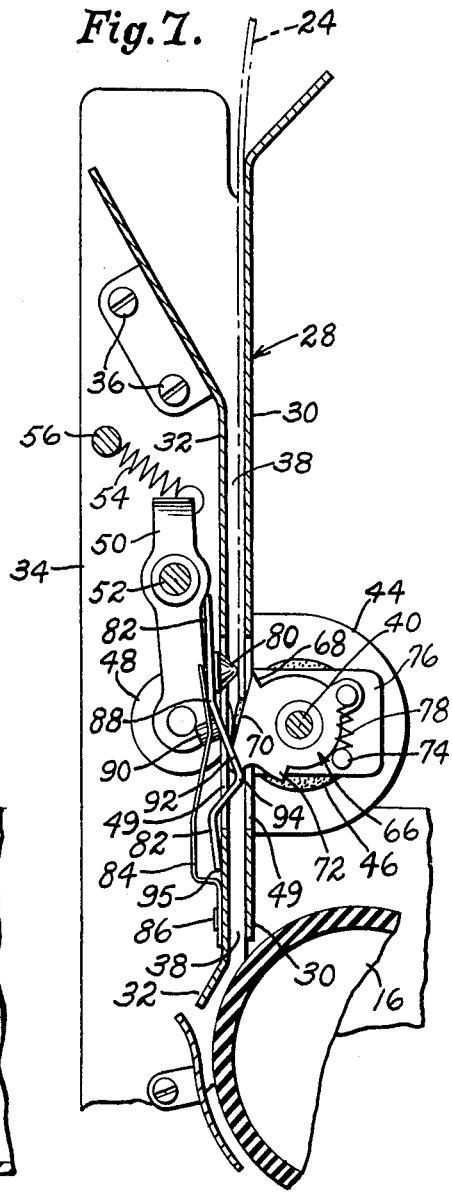
INVENTOR.
FORREST HOLLADAY.
BY
ATTORNEY.

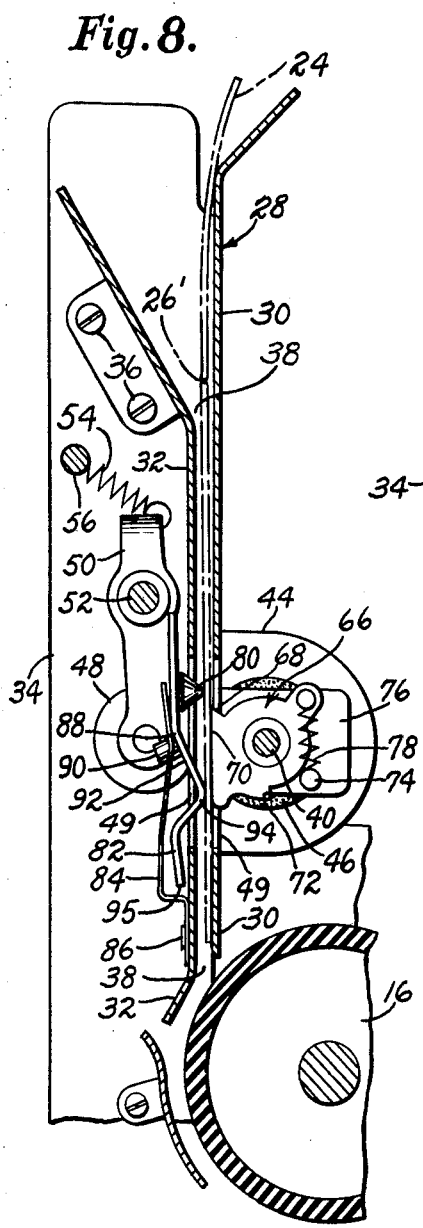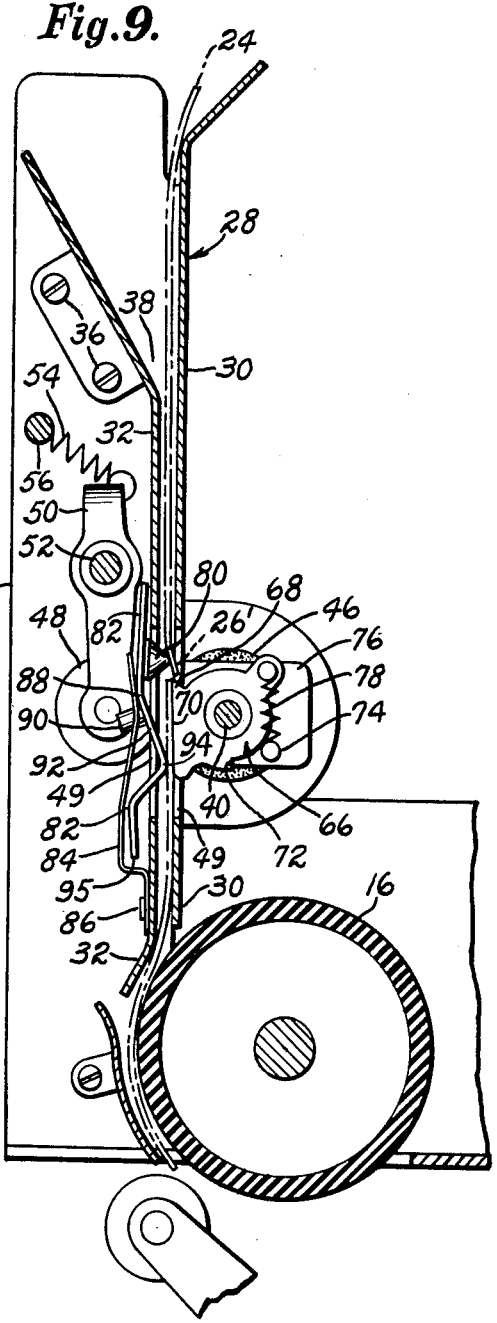

Oct. 12, 1965  F. HOLLADAY  3,211,271
LINE FIND DEVICE
Filed Nov. 6, 1963  5 Sheets-Sheet 5
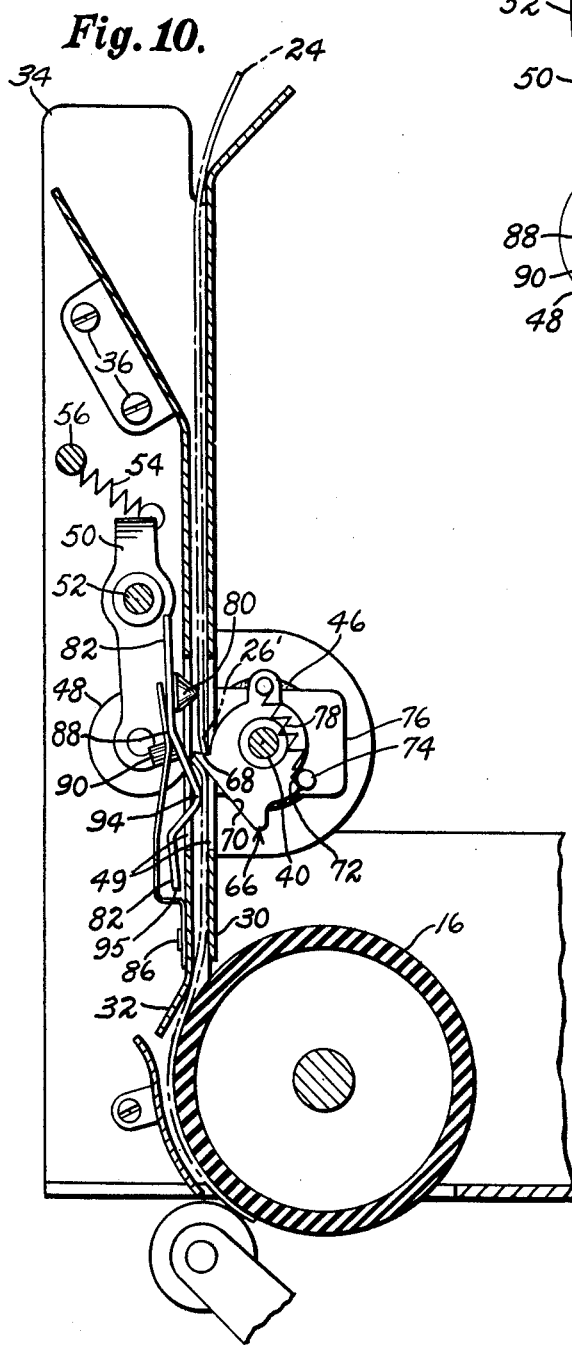
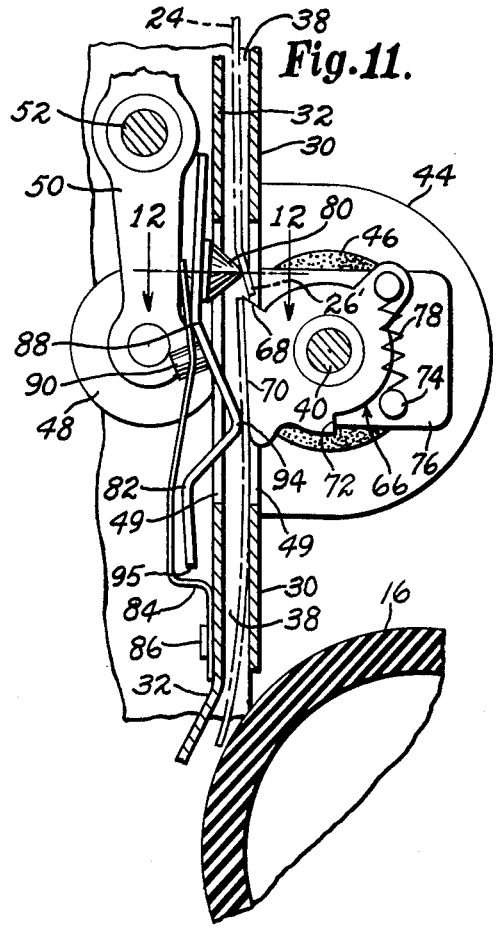
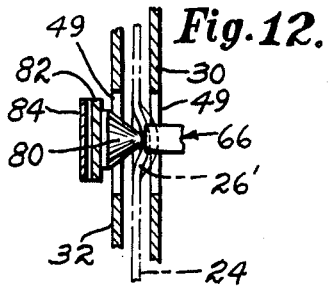
INVENTOR.
FORREST HOLLADAY.
BY
Wallace P. Land
ATTORNEY.

United States Patent Office 3,211,271
Patented Oct. 12, 1965

3,211,271
LINE FIND DEVICE
Forrest Holladay, Plymouth, Mich., assignor to Burroughs Corporation, Detroit, Mich., a corporation of Michigan
Filed Nov. 6, 1963, Ser. No. 321,789
6 Claims. (Cl. 197—127)

This invention relates generally to printing apparatus in which a paper sheet is fed to a platen, and particularly to an automatic line find mechanism therefor.

It is an object of the present invention to provide an improved line find mechanism to present the next available unused line of a record sheet to a printing position or datum line.

Another object of the invention is to provide in connection with a record sheet guideway of a printer, an improved automatically operable mechanism for stopping a record sheet at a position corresponding to the location in the sheet of a line designating perforation respresentative of the next available unused line.

Another object of the invention is to provide a sheet stopping mechanism of the above mentioned character which is positive in operation to assure engagement of a sheet stop member with an edge of a line designating perforation.

In connection with the next preceding object, it is specifically an object of the invention to provide an automatic line find mechanism including a movable abutment sheet edge displacement member which is automatically operable in response to the presence of a line designating sheet perforation to displace an edge of the perforation into the path of the sheet stop member to assure engagement therebetween.

A futher object of the invention resides in the function of the displacement member actuator in backing up a record sheet to hold a sheet stop member in its effective position to engage the displaced edge of a perforation.

Other objects of the invention will become apparent from the following detail description, taken in connection with the accompanying drawings in which;

FIG. 4 is a broken front view;

FIG. 5 is a vertical sectional view, taken along the line 5—5 of FIG. 4;

FIG. 6 is another vertical sectional view, taken along the line 6—6 of FIG. 4, showing the operating parts of a line find mechanism in their normal positions;

FIGS. 7, 8, 9 and 10 are views similar to FIG. 6, showing the operating parts of the line find mechanism in the positions they assume as a record sheet proceeds to the printing position;

FIG. 11 is an enlarged vertical sectional view similar to FIG. 9, and

FIG. 12 is a cross sectional view, taken along the line 12—12 of FIG. 11.

Figure 1:
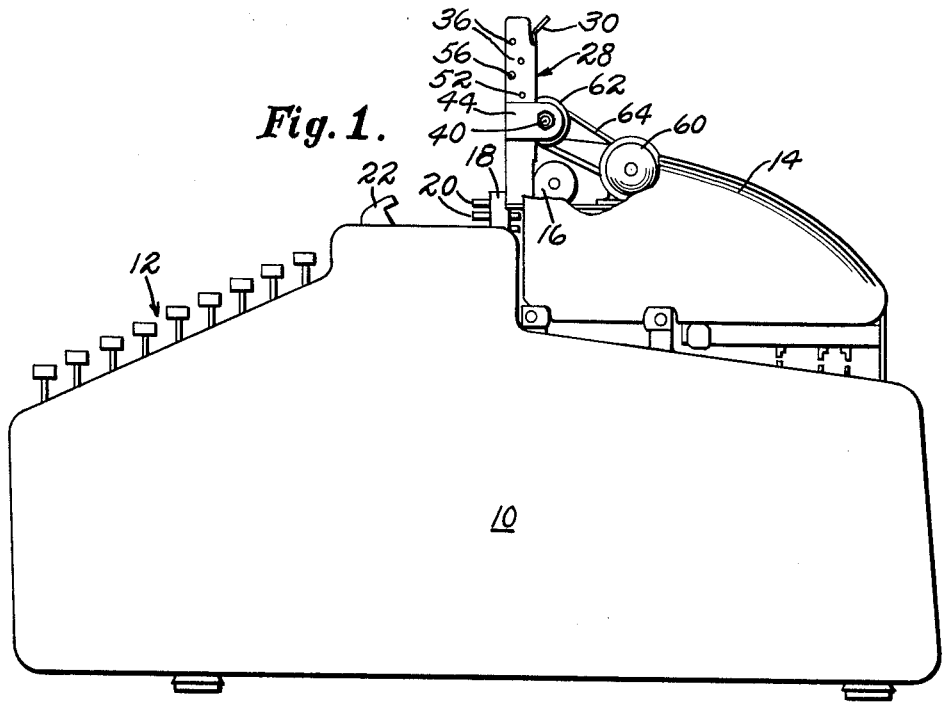
FIG. 1 is a side elevational view of a business machine having an automatic line find mechanism embodying features of the present invention.

Referring to the drawings by characters of reference, the business machine of FIG. 1 may be of any well known type for processing record sheets or cards, such as printing amounts in columns, and the machine is illustrated as including a mechanism housing 10, a keyboard 12, and an encased paper carriage 14. Mounted on the carriage 14 there is the usual roller type platen 16 and forwardly of the platen there is a print head 18 having a plurality of print elements 20. The print elements 20 are driven against the platen by a plurality of print hammers 22, only one of which is shown. As is well known in the operation of machines of the type illustrated, an amount to be printed is indexed by depressing the proper keys of keyboard 12 and the machine cycle key is subsequently depressed whereupon a cycle of machine operations occurs which includes a vertical positioning of the print head 18 to a printing line followed by operation of the print hammers 22 to drive the selected ones of the print elements 20 against the platen 16.

The above generally described machine is a well known conventional type accounting machine and is therefore not described herein in detail, but for a more complete description of the machine, reference may be had to the patent to Thomas M. Butler, No. 2,629,549, filed July 19, 1950, issued February 24, 1953, for Automatic Function Control Mechanism for Accounting Machines.

Figure 3:
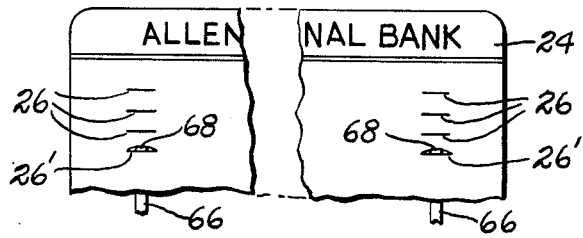
FIG. 3 is a fragmentary front view of a record sheet, suitable for use with my line find mechanism.
Figure 2:
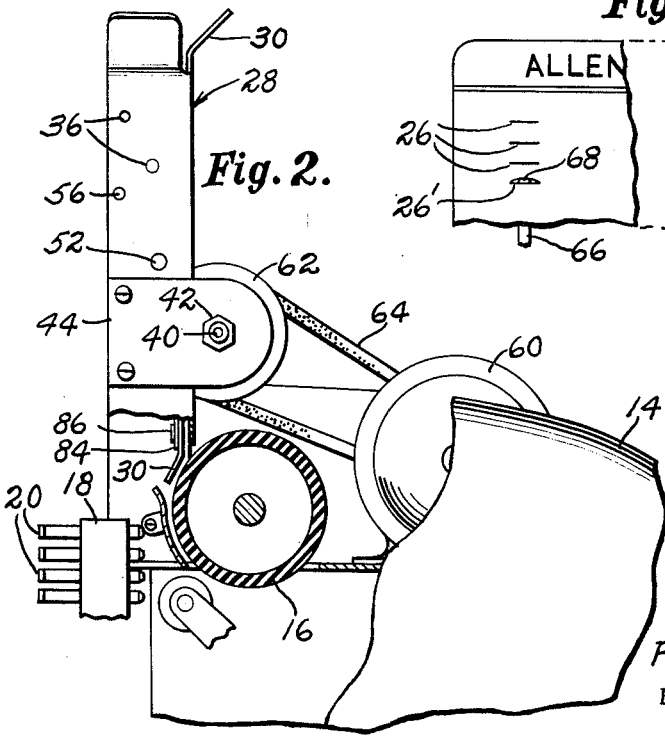
FIG. 2 is an enlarged fragmentary side view of the machine, shown partly broken away and in section.

A fragment of a record sheet 24, of a type suitable for use in connection with the present invention, is illustrated in FIG. 3. Adjacent each of the side edges of the sheet there is shown a vertical column of horizontal slit-like perforations 26 which designate lines that have been printed on the sheet. The lowermost slits 26' designate, of course, the next available unused line on the sheet. These slits 26, 26' are preferably made with a piercing tool that will slit the sheet without removing material therefrom and this operation is preferably performed at the time that printing takes place.

A vertical sheet guideway structure, designated in general by the numeral 28, is suitably mounted on and affixed to the carriage 14 above the platen 16. The guideway 28 may include a rear guide member or upright plate 30 and a pair of front, laterally positioned guide members or plates 32. In the present construction, the rear guide plate 30 has forwardly extending side flanges 34 between which are positioned the guide members 32, respectively mounted on the flanges, such as by means of screws 36, the guide members 32 being in broadside spaced relation to the guide plate 30 to define a vertical sheet guideway 38.

Spaced from and behind the rear guide plate 30 there is a horizontal driven shaft 40 journaled in end bearings 42 which are rigidly mounted on the guide plate side flanges 34 by suitable brackets 44. Affixed to the driven shaft 40 there is a pair of axially spaced sheet feed rollers 46 cooperable respectively with a pair of pressure rollers 48 to feed a sheet downwardly within the sheet guideway 38 to the platen 16. As shown, the rollers 46 and 48 project through aligned clearance openings 49 in the guideway plates 30, 32 and form a horizontal bight within the guideway. The pressure rollers 48 are rotatably mounted on the lower ends of inverted U-shaped levers 50, as seen in FIG. 4, and the levers are pivoted on a horizontal rod 52 which has its opposite ends secured in and to the opposite plate flanges 34. A pair of springs 54 are provided to urge the pressure rollers 48 into contact with the driven feed rollers 46, the springs being anchored to a cross rod 56 and attached respectively to upper arms of the levers 50.

An electric motor 60 may be provided to drive the feed rollers 46, and may be connected to driven shaft 40 by suitable pulleys 62 and a belt drive connection 64. In order to be able to eject a processed sheet upwardly out of the machine for access by the machine operator, the motor 60 may be of the reversible type, or if desired reverse feeding may be obtained by the use of a gear shift mechanism (not shown). Such a mechanism and its controls have not been shown, as they are well known in the art and form no part of the present invention.

Freely mounted on the shaft 40 there is a pair of laterally spaced sheet stop members 66 of a line find mechanism for automatically stopping a sheet at a position corresponding to the location of the next available line designating perforation 26' in the sheet. As the sheet stop members 66 are alike, the description will be directed to one of them for convenience and to avoid unnecessary repetitious description. The sheet stop member 66 is a plate-like member contoured on its edge to provide a stop arm 68, and a cam 70. In its normal, or inactive position shown in FIG. 6, the stop arm 68 is in a retracted position without and rearwardly of the guideway 38. Corresponding to the retracted position of the stop arm 68, the cam 70 is in its effective position projecting into the guideway 38 for engagement by the leading edge of the next sheet fed down the guideway. As shown, the cam 70 has a flat surface extending from the outer end of stop arm 68 downwardly and forwardly across the guideway 38 in the path of sheet travel. The force of travel of the leading edge of sheet 24 against the cam 70 will cause the member 66 to rotate counterclockwise, as viewed for example in FIG. 6, so as to move the stop arm 68 into its effective position, projecting into the guideway 38. Rotation of member 66 in the above mentioned counterclockwise direction is limited by the engagement of a shoulder 72 on its periphery with a stop pin 74 on a bracket 76 as shown in FIG. 10. A light coil spring 78 is provided to bias and return the member 66 to its normal position, FIG. 6. It will now be seen that member 66 is rotated counterclockwise for the purpose of positioning the sheet stop member 68 within the guideway 38 in position for engagement by the upper edge of the line designating slit 26'.

In accordance with the invention, engagement of the upper edge of slit 26' with the sheet stop member 68 is assured by the provision of an abutment or displacement member in the form of a conical plunger 80 which is arranged to distort a sheet in the area just above slit 26' so as to displace the upper edge of the slit rearwardly into the path of stop member 68, as shown for example in FIG. 11. The sheet abutment member 80 is carried by a yieldable pressure plate 82 that has a floating fulcrum on an upright leaf spring 84 which is the sole support for the plate 82. The pressure plate 82 is preferably made of sheet stock and is arranged to overlie the clearance opening 49 in guide member 32 in broadside relation to the sheet guide member, the abutment member 80 being riveted or otherwise suitably affixed to the pressure plate and projecting into the sheet guideway 38 just above the sheet stop member 66. The leaf spring 84 is affixed adjacent its lower end, as at 86, to the front of the sheet guide member 32, and adjacent its upper free end, the spring provides a fulcrum 88 for the plate 82. The spring 84 is tensioned so as to normally hold the pressure plate 82 against the front face of guide member 32, as shown for example, in FIGS. 5 and 6. A pin 90 affixed to the pressure plate 82 projects loosely through an aperture in the leaf spring 84 to support the pressure plate on the spring 84 for relative movement therebetween. Below the fulcrum 88, the pressure plate 82 has a sheet operated arm 92 which extends downwardly and rearwardly within the guideway 38 substantially to the vertical plane of the forward surface of guide plate 30 where the arm is reversely bent, as at 94, such that a lower portion of the arm projects outwardly through the clearance opening 49 in guide plate 32. The rounded arm portion 94 provides an abutment to engage or bear against the forward face of a record sheet in the guideway 38. At its lower end, as at 95, the pressure plate 82 fulcrums on the front face of the guide plate 32, as illustrated in FIG. 7. The width of the pressure plate arm 92 is slightly less than the width of the clearance opening 49 and the floating pressure plate 82 is thus limited in lateral movement by the adjacent side edges of the clearance opening 49 in guide plate 32.

Although the pressure plate 82 pivots about its movable fulcrum 88, the plate functions as a yieldable backup member for a sheet in the guideway so as to further assure engagement between the displaced perforation edge and the sheet stop member 68. Specifically, the yieldable pressure plate 82 functions to distribute the force exerted by spring 84 to two spaced apart points by way of the upper abutment member 80 and the lower abutment member 94 which urges the sheet toward the guide plate 30. The force exerted by the spring 84 is greater than the opposing force exerted by spring 78 so that the differential force holds member 66 in the position shown in FIGS. 9 and 11, or effective sheet stop position.

*Operation*

In operation, a record sheet is placed by the machine operator in the guideway 38 and is manually fed downwardly until the sheet is received in the bight of the feed rollers 46 and 48. Prior to its reaching the bight of the feed and pressure rollers, the leading edge of the record sheets engages and displaces the conical abutment member 80 which causes the pressure plate 82 to pivot slightly in a counterclockwise direction to the position shown in FIG. 7, against the tension of spring 84. In this position, the rounded end of the conical abutment member 80 is riding on the front face of the record sheet in vertical registry with the line designating slit 26'. As the sheet is moved further downwardly in the guideway 38 the leading edge of the sheet engages the bight of the feed rollers 46, 48 and at about the same time engages the normally inclined cam 70 of the sheet stopping member 66 and rotates the latter to the position shown in FIG. 8. Rotation of the feed rollers 46, 48, which may be continuously driven, now feed the sheet downwardly and the leading edge of the sheet engages the pressure plate arm 92 and further pivots the lever 82 in a counterclockwise direction which to some extent further tensions the opposing spring 84, thus increasing the spring force tending to move the abutment member 80 clockwise against the face of the record sheet. As a consequence, when the line designating slit 26' arrives at the abutment member 80, the spring 84 is capable of pivoting the pressure plate 82 in a clockwise direction and the abutment member 80 displaces a small area of the sheet, immediately above slit 26', rearwardly into the path of the sheet stop member arm 68 to assure engagement therewith, FIG. 9. Further downward feeding of the sheet pivots the pressure plate 82 counterclockwise to the position shown in FIG. 10 wherein it will be seen that the abutment member 80 is again riding against the face of the sheet and about the time that this occurs, the sheet pivots the stop member 66 until rotation of the latter, FIG. 10, is limited by engagement of abutment 72 with stop pin 74. The limiting of rotation of member 66 stops the downward travel of the sheet to position the next available unused line on the sheet at the printing line position. At this position, the feed rollers 46, 48 may be stopped, or they may be of the well known smooth surface type to slip against the face of the sheet. Following the printing operation, the feed rollers 46, 48 may be driven in reverse direction by reversing the motor operation or through reverse gears so as to eject the sheet for access by the machine operator.

While I have shown and described my line find mechanism in considerable detail it will be understood that many changes and variations may be made therein without departing from spirit and scope of my invention.

What is claimed is:

1. A line find mechanism for stopping the feeding of a flexible record sheet at a position corresponding to the location of a line designating perforation in the sheet comprising a sheet guide member, a sheet stop member positioned along said guide member for engagement by an edge of a perforation in the sheet, a yieldable pressure plate overlying said stop member and cooperating with said guide member in forming a sheet guideway, spring means yieldingly opposing movement of said pressure plate away from said guide member, said pressure plate mounted on said spring means in free floating relationship, means limiting movement of said pressure plate toward said guide member, a first abutment member carried by said pressure plate and projecting into said guideway to engage a sheet in the area of a perforation and flex an edge of the perforation into the path of said stop member, said first abutment member located anteriorly to said stop member with respect to the direction of sheet travel, and a second sheet abutment member on said pressure plate projecting into said guideway posteriorly to said stop member.

2. A line find mechanism for stopping the feeding of a flexible record sheet at a position corresponding to the location of a line designating perforation in the sheet comprising means defining a path of travel for a record sheet, a rotary sheet stop member positioned along said guideway, said stop member biased to a normal position without said guideway and rotatable to a position projecting into said guideway, a leaf spring having a free end, a lever fulcrumed intermediate its ends on the free end of said leaf spring, a displacement member carried by one arm of said lever anteriorly to said stop member with respect to the direction of sheet travel, said displacement member carried by one arm of said lever anteriorly to said stop member with respect to the direction of sheet travel, said displacement member positioned for movement by said spring to flex a portion of a sheet in the area of the perforation and displace an edge of the perforation into position for abutment with said stop member, a second arm of said lever extending into said guideway at an inclination and posteriorly of said stop member, said spring urging said displacement member and said second lever arm toward said stop member to overcome the bias of the latter, and an arm rotatable with said stop member and projecting into said guideway for rotation by the leading edge of a sheet to rotate said stop member into the path of the displaced perforation edge.

3. A line find mechanism for stopping the feeding of a flexible record sheet at a position corresponding to the location of a line designating perforation in the sheet comprising guide means defining a path of sheet travel, a spring on one side of the path of sheet travel exerting a force transversely of the path of sheet travel, a lever fulcrumed intermediate its ends and freely floating on said spring, an abutment member carried by said lever to engage a face of a record sheet and under the action of said spring operable to flex a portion of a sheet in the area of a perforation laterally of the sheet, a second abutment member carried by said lever on the other side of said fulcrum from said first abutment member and engageable by a sheet under the action of said spring, a rotary sheet stop member on the other side of the path of sheet travel from said lever and between said abutment members, said sheet stop member normally biased by a force less than the force exerted by said spring to an ineffective retracted position without the path of sheet travel, and a cam rotatable with said stop member and normally projecting into the path of sheet travel for rotation by the leading edge of a sheet in a direction to position said stop member in the path of a deflected edge of a perforation.

4. A line find mechanism for stopping the feeding of a resilient record sheet at a position corresponding to the location of a line designating perforation in the sheet comprising a pair of spaced apart sheet guide members defining a path of sheet travel, a sheet stop member pivotally mounted laterally and outwardly of one of said sheet guide members, said stop member normally retracted to an ineffective position and pivotal to an effective position between said guide members for engagement by a sheet perforation, a first yieldable abutment projecting into the path of sheet travel from the other of said guide members to engage a face of a sheet in the path of a perforation, said abutment member disposed anteriorly to said stop member with respect to the direction of sheet travel, a second yieldable sheet abutment projecting within the path of sheet travel posteriorly to said stop member, said stop member and said first and second abutments in a common plane transversely of the path of sheet travel, and a cam joined to said stop member and extending therefrom across said path of travel to said second abutment for engagement by the leading edge of a sheet to pivot said stop member to effective position, said stop member and said first and second abutments constituting three relatively movable sheet pressure points to flex a sheet for engagement of the sheet perforation edge against said stop member.

5. A line find mechanism for stopping the feeding of a resilient record sheet at a position corresponding to the location of a line designating perforation in the sheet comprising means defining a path of travel for a record sheet, a rotatably mounted sheet stop member normally retracted without said guideway laterally thereof and rotatable to an effective position within said guideway for engagement by an edge of a sheet perforation, a rotatably mounted cam normally projecting into said guideway for engagement and rotation by the leading edge of a sheet and connected to said stop member to rotate the latter into said effective position within said guideway, said cam in the effective position of said stop member functioning as a back-up for a sheet and in a plane with said stop member transverse to the axis of rotation of the latter, a yieldable pressure plate overlying said cam on the other side of said guideway from said cam, a yieldable abutment carried by said pressure plate and projecting into the guideway anteriorly of and adjacent to the effective position of said stop member with respect to the direction of sheet travel, said abutment to exert a force against a sheet to press an edge of a perforation into position to engage said stop member, and a second yieldable abutment projecting into said guideway adjacent to and posteriorly of said cam with respect to the direction of travel of a sheet, said stop member and said first and second abutments constituting three relatively movable sheet pressure points defining a sinuous sheet path.

6. A line find mechanism for stopping the feeding of a resilient record sheet at a position corresponding to the location of a line designating perforation in the sheet comprising means defining an upright sheet guideway, a pressure plate overlying one side of said guideway and yieldably biased broadside toward the other side of said guideway, a displacement member carried by said pressure plate and normally projecting into said guideway to engage and displace an upper edge of a perforation toward said other side of said guideway, a sheet stop member mounted on said other side of said guideway for rotation about a horizontal axis below said displacement member and parallel to said other side of said guideway, said sheet stop member having a normally retracted position without said guideway and opposite said displacement member and rotatable into said guideway below said displacement member to an effective position to engage a displaced edge of a sheet perforation, a yieldable abutment carried by said pressure plate below said stop member and projecting into said guideway toward said other side thereof, and a cam on said stop member engageable by the leading edge of a sheet to rotate said stop member to effective position and extending downwardly from said stop member across said guideway in overlying relation to said yieldable abutment.

References Cited by the Examiner

UNITED STATES PATENTS

| | | |
|---|---|---|
| 2,831,560 | 4/58 | Oberholzer et al. 197—128 |
| 2,832,454 | 4/58 | Martin 197—127 |
| 3,100,037 | 7/63 | Green et al. 197—127 |
| 3,107,772 | 10/63 | Templeton 197—127 |
| 3,137,379 | 6/64 | Oberholzer et al. 197—128 |

ROBERT E. PULFREY, *Primary Examiner.*